*R. Hayden,*

*Shutter Fastener.*

No. 97,194.    Patented Nov. 23, 1869.

Witnesses
E. M. Bliss
J. W. Bliss

Inventor
Randolph Hayden

United States Patent Office.

RANDOLPH HAYDEN, OF MIDDLETOWN, CONNECTICUT, ASSIGNOR TO HIMSELF AND JAMES C. FERREE, OF SAME PLACE.

Letters Patent No. 97,194, dated November 23, 1869.

IMPROVED SHUTTER-FASTENING.

The Schedule referred to in these Letters Patent and making part of the same.

*To all whom it may concern:*

Be it known that I, RANDOLPH HAYDEN, of Middletown, county of Middlesex, and State of Connecticut, have invented certain new and useful Improvements in Blind-Fastening; and to enable others skilled in the art to make and use the same, I will proceed to describe its construction, referring to the drawings, in which the same letters indicate like parts in each of the figures.

The nature of this invention in blind-fasteners consists of a double fastening-hook, both parts of which can be easily operated from one side of the blind, while only one part can be actuated from the opposite side, in combination with a spring, to actuate one or both, singly or jointly, and a cylindrical case, in which they are arranged and secured for use.

In the accompanying drawings—

Figure 1:
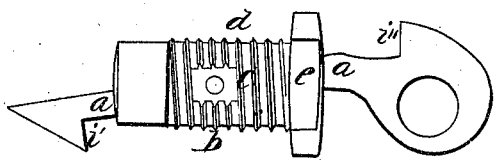
Figure 1 is a side view of this invention.
Figure 2:
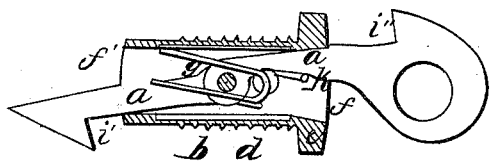
Figure 2 is a sectional side view thereof.
Figure 3:
Figure 3 is a view of an actuating-spring, by which the two-part shell or case is secured together.

$c$ is a two-part shell or case, having a screw-thread, $d$, formed on its outer surface.

$e$ is a nut or six-side formation, (more or less,) by means of which a wrench may be applied, for turning it into the orifice made therefor.

$f$ is a slot, formed in the centre of the large end of the case.

$f'$ is a slot, formed in the centre of the small end of the shell, in which the hook is allowed to play.

$g$ is a spring, the peculiar formation of which is clearly shown. (See fig. 5.) This spring is placed astride of the double hook and pin. The two parts, $i\, i$, bear, one against the back side of the hook $i'$, and the other against the inside of the case, which act to press the hook $i'$ forward; and the prong $k$ acts against the hook $i''$, to press it in the opposite direction, so that when the blind is closed, and fastened by the hook $i''$, in the common way, it cannot be unfastened from the outside by the action of the hook $i$; but when the blind is thrown open, the hook $i'$ can be unfastened by the action of the hook $i''$.

I believe I have thus shown the nature, construction, and advantage of this invention, so as to enable others skilled in the art to make and use the same therefrom.

I claim, in a blind-fastener, the combination of a double fastening-hook, $a\, a$, hinged upon one fulcrum, $b$, with an actuating-spring, $g$, and screw cylindrical case, substantially as set forth.

RANDOLPH. HAYDEN. [L. S.]

Witnesses:
   E. W. BLISS,
   J. W. BLISS.